United States Patent [19]

Layh

[11] 4,429,242
[45] Jan. 31, 1984

[54] ARRANGEMENT OF ACTUAL VALUE INDICATOR

[76] Inventor: Hans-Dieter Layh, Zachersweg 17, 71721 Gemmrigheim, Fed. Rep. of Germany

[21] Appl. No.: 384,169

[22] Filed: Jun. 1, 1982

[30] Foreign Application Priority Data

Jun. 6, 1981 [DE] Fed. Rep. of Germany ....... 3122655

[51] Int. Cl.³ ............................................. H02K 11/00
[52] U.S. Cl. ................................ 310/71; 310/68 R; 310/89; 310/112
[58] Field of Search ...................... 310/68, 112, 89, 71

[56] References Cited

U.S. PATENT DOCUMENTS

| | | | |
|---|---|---|---|
| 3,445,697 | 5/1969 | Costa | 310/68 R |
| 3,445,698 | 5/1969 | Miko | 310/89 |
| 3,465,184 | 9/1969 | Armstrong et al. | 310/68 R |
| 3,821,620 | 6/1974 | Lindberg | 310/112 |
| 3,909,644 | 9/1975 | Wieser | 310/71 |
| 4,110,676 | 8/1978 | Edick et al. | 310/112 |
| 4,284,917 | 8/1981 | Yassemi | 310/89 |

Primary Examiner—Donovan F. Duggan
Assistant Examiner—Anita M. Ault
Attorney, Agent, or Firm—Michael J. Striker

[57] ABSTRACT

Disclosed is an adapter unit for converting a standard electrical motor into a variable-speed electrical motor. The pre-assembled unit includes a tachometric generator and a ventilating electrical motor driving a fan wheel. Both the generator and the ventilating motor with the wheel are arranged in a common adapter housing which is integrally formed with a tubular connecting piece directed radially to the driving shaft of the motor to be adapted and supporting on its outer end a terminal box. Connecting cables for the tachometric generator and for the ventilating electrical motor are guided through the connecting piece to the terminal box.

15 Claims, 2 Drawing Figures

ARRANGEMENT OF ACTUAL VALUE INDICATOR

BACKGROUND OF THE INVENTION

The present invention relates in general to an arrangement of an actual value indicator for indicating rotary speed of variable-speed drives, particularly of variable-speed electrical motors.

Driving machines such as standard type electrical motors are manufactured in large series. Variable-speed driving machines, on the other hand, are produced in relatively small numbers, so that the necessary manufacturing costs are hitherto considerably high. The term "variable-speed driving machine" in this context denotes generally an electrical drive the speed of which is controllable by a control device. For example, if it is desired to keep, within a certain load range, the speed of the drive constant, the control device compares the actual speed with a preset nominal speed value and automatically compensates the ascertained differences by applying a corresponding control voltage to the drive.

SUMMARY OF THE INVENTION

It is therefore a general object of the present invention to overcome the aforementioned disadvantages in manufacturing variable-speed drives.

More particularly, it is an object of the invention to provide an arrangement of an actual value indicator by means of which existing standard type electrical motors can be in a simple manner converted into variable-speed motors.

In keeping with these objects, and with others which will become apparent hereafter, one feature of the invention resides, in the provision of an auxiliary housing for accommodating an actual value indicator, the auxiliary housing being detachably connectable to the housing of the standard electrical motor opposite its driving shaft, the auxiliary housing being formed with a tubular connecting piece which is directed radially to the shaft and serves for receiving connecting cables to the indicator, and a terminal box arranged on the outer end of the connecting piece for interconnecting the cables between the indicator and the motor.

The arrangement of the actual value indicator according to this invention results in a compact unit which can be readily mounted on a standard electrical motor which is to be converted into a variable-speed motor. Particularly the installation of connecting cables is greatly facilitated, inasmuch as it suffices to connect only the ends of the cable in the terminal box. The interconnection of the cables in the interior of the auxiliary housing is namely completed during the manufacture and installation of the actual value indicator into the auxiliary housing.

The terminal box is equipped with conventional clamps, connecting bolts, and the like.

The tubular connecting piece serves for mounting the terminal box outside the cover plates which are fastened on the motor housing and through which the connecting piece projects. Preferably, the length of the radially directed tubular piece is larger than the radius of the electrical motor housing, so that the connecting piece can be adjusted to different configurations of the covering parts.

The actual value indicator by itself can be in principle of any suitable construction known from prior art. Preferably, direct current or alternating current tachometer generators are used or also electrooptical impulse generators for indicating absolute or incremental values.

According to a preferred embodiment of this invention, the stator of a tachometric generator is mounted in the auxiliary housing, whereas the rotor of the tachometric generator is mounted on the projecting end of the driving shaft of the motor which is surrounded by the auxiliary housing.

According to another feature of this invention, the armature of the tachometric generator is constituted by a permanent magnet which is centered for joint rotation on the shaft of the electric motor by means of a sleeve which is clamped to the end portion of the shaft by a corrugated metal sheet ring pressed between the shaft and the inner surface of the sleeve. This embodiment enables a particularly simple and simultaneously precise installation of the tachometric generator without the danger of wobbling or uneven running of the armature magnet. The sleeve serves, apart from the fixing of the permanent magnet armature, also for the mechanical reinforcement of the latter.

In highly loaded variable-speed motors, the motor shaft can be extended so as to pass through the auxiliary housing for the tachometric generator and support on its free end a fan wheel for venting the entire variable-speed motor.

In order to achieve a compact construction of the auxiliary housing with reduced axial dimensions, the part of the auxiliary housing which faces the fan wheel is adjusted to the inner contour of the fan wheel. In addition, the radial connecting piece can be formed with a recess for accommodating a part of the fan wheel.

Frequently it is desired to provide the variable-speed motor with an independent ventilating device powered from a separate source. For this purpose, the auxiliary housing encloses a separate ventilating electrical motor, the feeding cables of which are directed through the tubular connecting piece into the terminal box.

In the preferred embodiment of this invention, the actual value indicator is combined with the ventilating device and the auxiliary housing into an attachment unit which can be readily fastened to the housing of the electrical motor and which includes all devices necessary for controlling the speed of the driving motor, as well as for exhausting waste heat resulting during the operation of the aggregate. As mentioned before, this compact unit can be united with a standard electrical motor with minimum installation costs.

In prior-art arrangements the tachometric generator is installed in the housing of the driving motor whereas the ventilating unit has a separate driving motor with its own housing or with special mounting means connectable to the driving motor or the tachometer generator. Moreover, the electrical connections of such prior-art separated devices is usually carried out by means of conduits arranged on the housing of the driving motor and interconnected in the terminal board of the driving motor. Alternatively, in prior-art constructions additional terminal box is attached to the driving motor or to the existing terminal board, and the conductors from the tachometric generator and from the independent ventilating device are either in the form of external cables or installed in protective pipes. Also known are arrangements in which the terminal box is seated on the hood of the ventilator for the driving motor so that the cable connecting the tachometric generator and the connection cables and components for the independent ventilating device must be also installed in the ventilating hood. The disadvantage of this known arrangement is the necessity to lead the connection cables from the tachometer generator and from the ventilating motor either in the air stream and on the outer side of the housing of the driving motor or through the latter so that insufficient protection of the cables or a very complicated installation is necessary.

In contrast, the arrangement of this invention particularly when the actual value indicator is used for controlling the variable speed of the driving motor and includes also the ventilating motor, simplifies considerably both the installation of the connection cables and the arrangement of the ventilating device. Its advantages are most apparent in connection with standard type electrical motors which are converted into variable-speed motors. The driving motor for the separate ventilation can be of any suitable type, such as a single-phase or multi-phase alternating current motor, or a direct current motor, or also a split-pole motor.

A ventilating hood adjusted to the size of the housing for the actual value generator and to the size of the fan wheel preferably encloses the entire auxiliary housing and forms an annular interspace therewith. The venting hood is also connected to the housing of the driving motor coaxially with its driving shaft. For supporting the ventilating hood, the auxiliary housing for the tachometric generator is provided with a star-shaped partition secured to a circumferential portion of the auxiliary housing and supporting on its free ends the inner wall of the ventilating hood, whereby the supporting arms are spaced apart from each other at a distance sufficient for passing through without obstacles the cooling air stream generated by the fan wheel.

The edge of the ventilating hood adjoining the radial connecting piece of the auxiliary housing is formed with a cutout matching the contour of the connecting piece, so that the installation and removal of the connecting hood is simplified.

If desired, the auxiliary housing can be provided with several tubular connecting pieces for guiding separate strands of cable. in this case, the ventilating hood is formed with a corresponding number of cut-outs for accommodating the connecting pieces.

The radial cross section of the auxiliary housing or of the auxiliary housing flash ventilator unit is preferably circular and concentrically arranged about the shaft of the driving motor. An annular mounting flange surrounding the shaft serves for fastening the auxiliary housing to the end side of the motor housing. The auxiliary housing is preferably hermetically sealed so as to be applicable for any safety level, including protection against explosion.

The terminal box can also serve for housing a starting capacitor for the ventilator motor if necessary.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
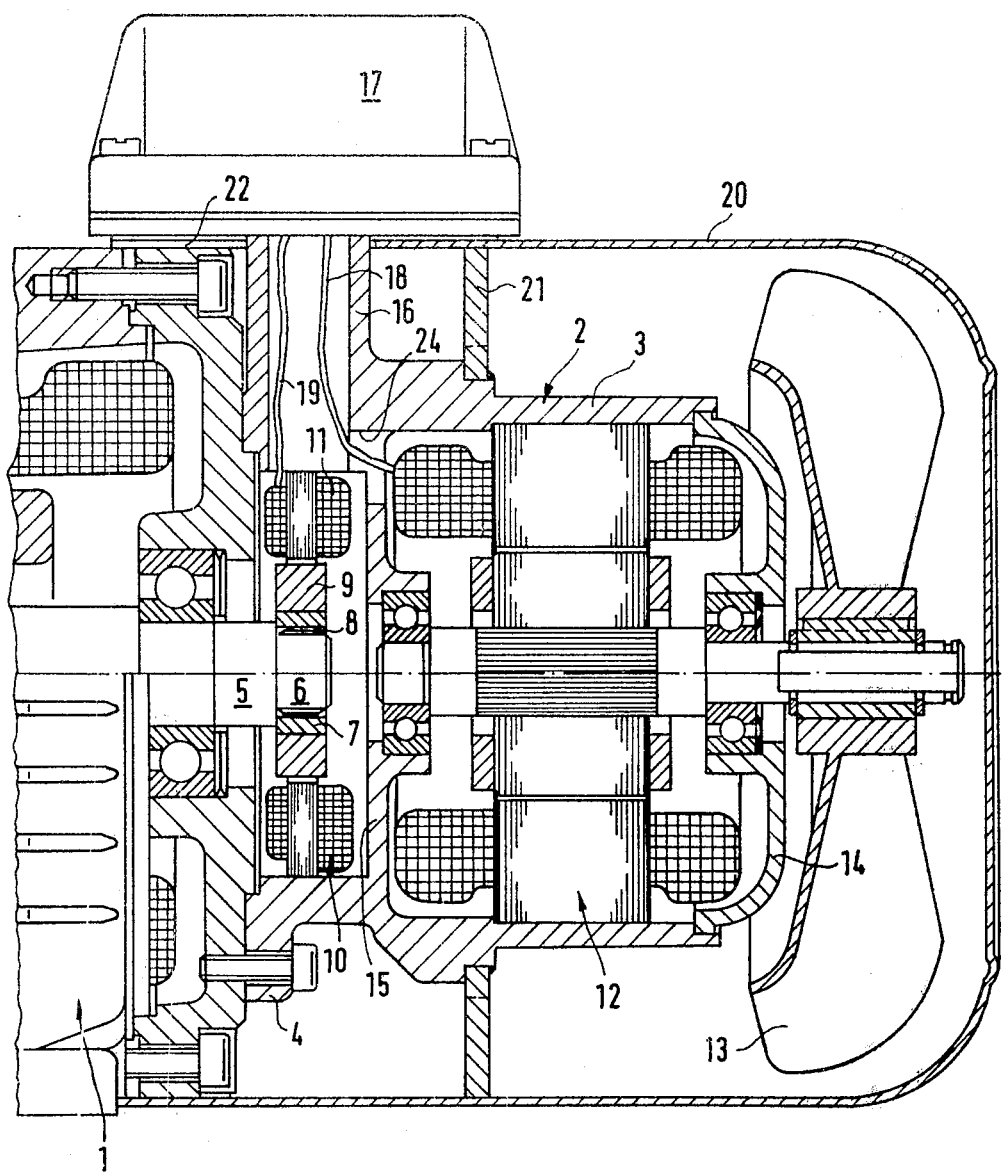
FIG. 1 is a sectional side view of an adapter unit including a tachometric generator and separate ventilator.

Referring firstly to FIG. 1, there is illustrated a cut away part of a driving motor housing 1 which is provided with a detachable adapter unit 2 including a tachometric generator and separate ventilator. The unit 2 includes a substantially cylindrical housing 3 provided with a mounting flange 4 which is fastened by means of screws to an end wall of the motor housing 1. In this embodiment, the end portion 6 of the driving shaft 5 of the driving motor projects into the attached housing 3. The shaft portion 6 is reduced in diameter and supports sleeve 7 which is provided with a corrugated metal sheet ring 8 which is pressed on the shaft portion 6 to serve as a clamping ring for the sleeve 7 which simultaneously compensates for manufacturing tolerances. Sleeve 7 supports a permanent magnet 9 of a tachometric generator 10. By the action of the corrugated tolerance ring 8, the magnet 9 is reliably seated on the shaft without the need for using screws or special tools and without the danger of damage when it is removed from the shaft.

The stator 11 of the tachometric generator 10 is rigidly connected to the inner wall of the housing 3 around the rotor 9.

In addition, housing 3 accommodates a ventilating electric motor 12 for driving a fan wheel 13. The ventilating motor 12 is arranged between a transverse partition 15 in the housing 3 separating the tachometric generator and the open end of housing 3 is closed by a cover 14.

The other end portion of housing 3 adjoining the stator 11 of the tachometric generator 10, is formed with a radially directed tubular connecting piece 16 which communicates with the compartment of housing 3 for the ventilator motor 12 by means of an opening 24 in the partition 15. A terminal box 17 is attached to the free end of the connecting piece 16.

The connecting piece serves as a protective installation channel for cables 18 and 19 for the ventilating motor 12 and the tachometric generator 10, respectively. These cables are interconnected in the terminal box 17. In this manner it is ensured that all connecting cables of the entire unit are reliably enclosed.

The housing 3, together with the fan wheel 13, are enclosed in a ventilator housing 20 which defines therewith an annular interspace. The ventilating housing is also fixed at one end thereof to the motor housing 1. A star-shaped support 21 of metal sheet mounted on a circumferential portion of the housing 3 serves for supporting the inner wall of the ventilating housing 20 and is fixed thereto by wedging, for example.

The edge of the ventilating housing 20 engaging the mounting flange of the motor housing 1 is formed with an axially directed slot or cut-out matching the connecting piece 16. In this manner, the ventilating housing can be attached to or removed from the motor housing without dismantling the auxiliary housing 3.

In order to achieve a compact design of the entire arrangement, the cover 14 of the housing 3 has a shape which matches a recessed central part of the fan wheel 13.

Figure 2:
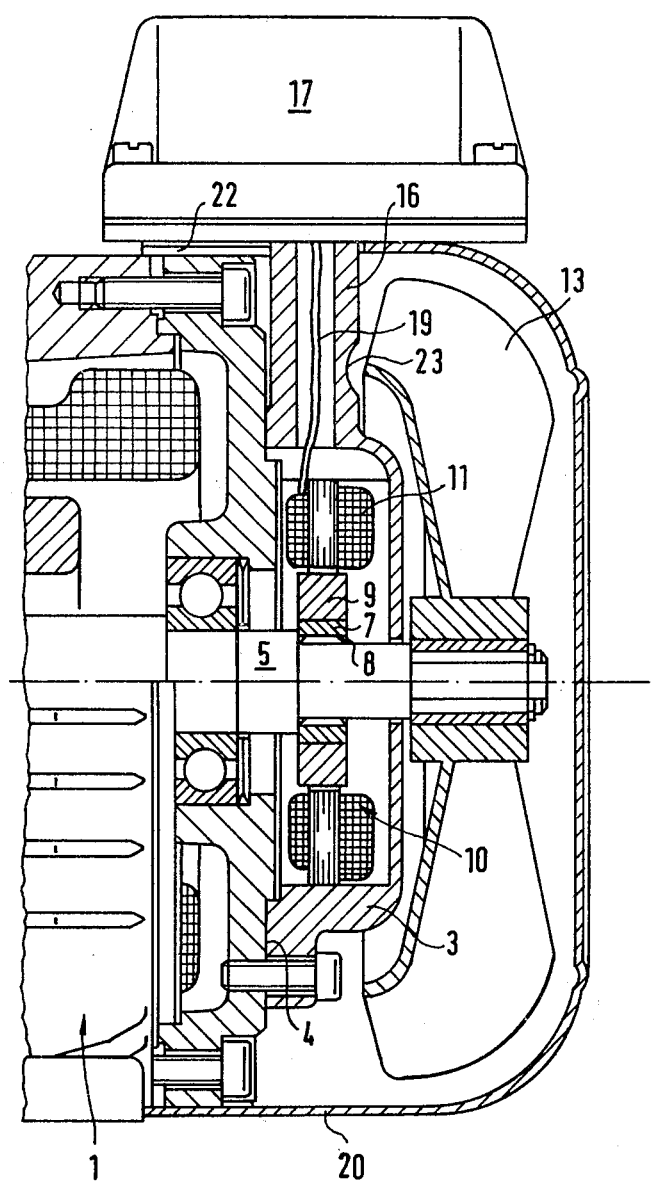
FIG. 2 is an embodiment of this unit with a ventilator driven by the driving motor.

In the embodiment according to FIG. 2, the fan wheel 13 is driven directly by the driving shaft 5 of the driving motor 1. For this purpose, the driving shaft 5 of the driving motor extends throughout the auxiliary housing 3 and the separate ventilating motor is dispensed with. Also in this case, in order to achieve a compact construction, the end wall of the auxiliary housing 3 facing the fan wheel 13 is adjusted to the inner contour of the recessed fan wheel 13. In addition, the tubular connection piece 16 is formed with an annular recess into which a projecting rear part of the fan wheel 13 projects.

Otherwise, the arrangement of the embodiment according to FIG. 2 corresponds substantially to the embodiment of FIG. 1 particularly as regards the fastening of the permanent magnet 9 of the rotor on the shaft 5.

It will be understood that each of the elements described above, or two or more together, may also find a useful application in other types of constructions differing from the types described above.

While the invention has been illustrated and described as embodied in specific examples of the actual value indicator units for use in connection with standard electrical motors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An arrangement of an actual value indicator for variable-speed drives, particularly for use in connection with an electrical motor having a motor housing and a driving shaft, comprising a hermetically closed adapter housing for accommodating an actual value indicator, said adapter housing being connectable to said motor housing around said driving shaft, a radially directed tubular connecting piece formed on said adapter housing for receiving connecting cables leading from said actual value indicator, and a terminal box arranged on the free end of said connecting piece for interconnecting said cables.

2. An arrangement as defined in claim 1, wherein said actual value indicator is a direct current or an alternating current tachometric generator.

3. An arrangement as defined in claim 1, wherein said actual value indicator is an optoelectrical impulse generator for indicating absolute or incremental speeds of the driving motor.

4. An arrangement as defined in claim 1, wherein said actual value indicator includes a stator and a rotor, said stator being rigidly connected to the inner wall of said adapter housing and said rotor being attached to said shaft for joint rotation therewith.

5. An arrangement as defined in claim 4, wherein said rotor includes a permanent magnet, a sleeve attached to the center of said magnet, and a corrugated metal sheet ring pressed between said sleeve and said shaft to act as a clamping ring for said magnet.

6. An arrangement as defined in claim 5, wherein said motor shaft extends throughout the adapter housing and supports a fan wheel for ventilating the driving motor.

7. An arrangement as defined in claim 6, wherein said connecting piece is provided with an arcuate recess for accommodating a rear part of said fan wheel.

8. An arrangement as defined in claim 5, wherein said adapter housing accommodates a separate ventilating electrical motor for driving a fan wheel, the connection cables for the ventilating motor being directed through said tubular connection piece into said terminal box.

9. An arrangement as defined in claim 8, including a fan wheel having a recessed rear portion, and said adapter housing being provided with an end wall cover matching said recessed portion.

10. An arrangement as defined in claim 9, further comprising a ventilator hood surrounding the adapter housing and defining therewith an interspace leading to said driving motor.

11. An arrangement as defined in claim 1, wherein said ventilating hood is formed with an open end defining a mounting edge connectable to a corresponding flange on said motor housing, said edge being formed with an axially directed cut-out matching said connecting piece.

12. An arrangement as defined in claim 11, wherein said adapter housing has a substantially circular radial cross section and being formed at one end thereof with an annular mounting flange surrounding the motor shaft, said mounting flange being attachable to a corresponding flange on said driving motor.

13. An arrangement as defined in claim 8, wherein said ventilating electrical motor includes a capacitor arranged in said terminal box.

14. An arrangement as defined in claim 1, wherein said adapter housing is formed with a plurality of connection pieces for said cables.

15. An arrangement of an actual value indicator for variable-speed drives, particularly for use in connection with an electrical motor having a motor housing and a driving shaft, comprising an adapter housing for accommodating an actual value indicator, said adapter housing being connectable to said motor housing around said driving shaft, a radially directed tubular connecting piece formed on said adapter housing opposite said actual value indicator for receiving connecting cables leading from said actual value indicator, a terminal box arranged on the free end of said connecting piece for interconnecting said cables, said actual value indicator including a stator and a rotor, said stator being rigidly connected to the inner wall of said adapter housing and said rotor being attached to said shaft for joint rotation therewith, said rotor including a permanent magnet, a sleeve attached to the center of said magnet, and a corrugated metal sheet ring pressed between said sleeve and said shaft to act as a clamping ring for said magnet, said adapter housing accommodating a separate ventilating electrical motor for driving a fan wheel, the connection cables for the ventilating motor being directed through said tubular connection piece into said terminal box, said fan wheel having a recessed rear portion, and said adapter housing being provided with an end wall cover matching said recessed portion, a ventilator hood surrounding the adapter housing and defining therewith an interspace leading to said driving motor, and a star-shaped spacer provided between the outer surface of the adapter housing and the inner wall of said ventilator hood.

* * * * *